United States Patent
Plestid (10) Patent No.: US 8,412,189 B2
(45) Date of Patent: Apr. 2, 2013

(54) METHOD FOR WIRELESS SYSTEM SELECTION OPTIMIZATION

(75) Inventor: Trevor Plestid, Waterloo (CA)

(73) Assignee: Research In Motion Limited, Waterloo, Ontario (*) Notice: Subject to any disclaimer, the term of this patent is extended or adjusted under 35 U.S.C. 154(b) by 321 days.

(21) Appl. No.: 12/357,771

(22) Filed: Jan. 22, 2009

(65) Prior Publication Data

US 2010/0184433 A1 Jul. 22, 2010

(51) Int. Cl.
*H04W 4/00* (2009.01)

(52) U.S. Cl. .................. 455/434; 455/425; 455/456.1; 455/435.1; 455/550.1; 455/436; 370/331; 370/332; 370/350; 370/328

(58) Field of Classification Search .......... 455/424–425, 455/433, 458, 435.2, 550.1, 434, 446–447; 370/331–332, 324, 350, 313
See application file for complete search history.

(56) References Cited

U.S. PATENT DOCUMENTS

| | | | | |
|---|---|---|---|---|
| 6,351,643 B1* | 2/2002 | Haartsen | ....................... | 455/450 |
| 6,628,639 B1* | 9/2003 | Ishii | ............... | 370/346 |
| 2007/0275717 A1* | 11/2007 | Edge et al. | .................... | 455/434 |
| 2009/0270091 A1* | 10/2009 | Joshi et al. | .................... | 455/434 |

FOREIGN PATENT DOCUMENTS

| | | |
|---|---|---|
| WO | 02076117 A1 | 9/2002 |
| WO | WO 02/076117 A | 9/2002 |
| WO | 02080606 A1 | 10/2002 |
| WO | 2006061670 A1 | 6/2006 |
| WO | 2007103975 A1 | 9/2007 |
| WO | WO 2007/103975 A | 9/2007 |
| WO | 2008064165 A2 | 5/2008 |
| WO | 2009143023 A1 | 6/2009 |

OTHER PUBLICATIONS

European Search Report for EP Application No. 09 15 1086, mailed on Jul. 1, 2009.
European search report for corresponding EP application 11183785.2 dated Jun. 4, 2012.

* cited by examiner

*Primary Examiner* — Anthony Addy
*Assistant Examiner* — Babar Sarwar
(74) *Attorney, Agent, or Firm* — Gowling Lafleur Henderson LLP (57) ABSTRACT

A method for improved system selection by wireless mobile devices in 3GPP networks is provided. Location data is retrieved by the wireless device to estimate an initial system on which the wireless mobile device will attempt initialization. Using the location data, an absolute radio frequency channel number (ARFCN) associated with the location data is determined from an ARFCN table stored in memory in the wireless mobile device. The wireless mobile device can then perform system selection using the determined ARFCN. A server generates and maintains the ARFCN table which is initially provided to the wireless mobile device at manufacturer, during provisioning or as an over-the-air update.

18 Claims, 5 Drawing Sheets

METHOD FOR WIRELESS SYSTEM SELECTION OPTIMIZATION

TECHNICAL FIELD

The present disclosure relates to wireless mobile networks and in particular to system selection by a mobile wireless device during initialization on a wireless network.

BACKGROUND

In 3GPP wireless network deployments, carriers or service providers deploy multiple frequencies for distributing handling traffic capacity. During initialization, for example of a factory fresh device, or re-selection a wireless mobile device must scan a wide frequency range to determine the appropriate ARFCN (absolute radio frequency channel number) to enable access to the network as it has no knowledge yet as to which frequency is to be utilized. An exhaustive search can take a considerable length of time because there are a large number of potential frequencies to be scanned delaying a user's initial access to the system. The scan typically occurs during initial start-up or when a 'full reset' type event occurs requiring the wireless mobile device to re-sync to the network. There is therefore a need for improved system selection by wireless mobile devices that reduces system access time.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

In accordance with an aspect of the present disclosure there is provided a method of system selection in a mobile wireless device, the mobile wireless device operable on a 3GPP wireless network. An absolute radio frequency channel number (ARFCN) table is stored in a memory of the wireless mobile device. Location data associated with the wireless device is then retrieved prior to accessing the wireless network. An absolute radio frequency channel number (ARFCN) associated with the retrieved location data is determined from the ARFCN table stored in memory and system selection is then performed using the determined ARFCN.

In accordance with another aspect another aspect of the present disclosure there is provided a wireless mobile device in a 3GPP wireless network. The wireless mobile device comprises a memory and a control processor for executing instructions in the memory. The instructions comprising retrieving location data associated with the wireless device; determining an absolute radio frequency channel number (ARFCN) associated with the location data from an ARFCN table stored in memory in the wireless mobile device; and performing system selection using the determined ARFCN.

In accordance with yet another aspect of the present disclosure there is also provided a method on a server of enabling system selection by a plurality of wireless mobile devices in a 3GPP wireless network. An absolute radio frequency channel number (ARFCN) table is generated comprising location data and one or more associated ARFCNs. The ARFCN table is sent to each of the plurality of wireless mobile devices wherein each of the plurality of wireless mobile devices utilizes a selected ARFCN associated with determined location data when attempting to initialize on the wireless network.

In accordance with still yet another aspect of the present disclosure there is provided a server for enabling system selection by a plurality of wireless mobile devices in a 3GPP wireless network. The server comprising a memory and a processor for executing instructions in the memory. An absolute radio frequency channel number (ARFCN) table is generated comprising location data and one or more associated ARFCNs. The ARFCN table is sent to each of the plurality of wireless mobile devices wherein each of the plurality of wireless mobile devices utilizes a selected ARFCN associated with determined location data when attempting to initialize on the wireless network.

3GPP wireless networks are uniquely identified by a specific Mobile Country Code (MCC) and a specific Mobile Network Code (MNC). Wireless mobile devices are provisioned by carriers (service providers) to have a preferred MCC and MNC. In addition, when the carrier has roaming agreements a preferred list may be stored in a Subscriber Identity Module (SIM), a Universal SIM (USIM), or some other non-volatile memory module resident within the wireless mobile device. The MCC and MNC are utilized by the wireless mobile device to determine which system or network it should be operating on. However, the device must still scan the available frequencies to determine the appropriate ARFCN (absolute radio frequency channel number) to access the system. As wireless mobile devices have no notion of which ARFCNs to first scan, the scan is exhaustive which can take a very long time.

To accelerate the ability of a wireless mobile device to access a system during initialization or re-selection, a table or service book identifying known ARFCNs associated with systems is provided. The wireless mobile device can then initiate scanning to access the system using a known ARFCN associated with the likely system rather than having to scan all possible ARFCNs. The table can be provisioned during manufacture or delivered to the wireless mobile device upon registration in the field over-the-air for storage with the device. The table identifies routing area identifier (RAI) defining a MCC.MNC and an associated ARFCN for the particular network. When the mobile wireless device must acquire a system, location related data such as the MCC-.MNC associated with the device can be determined from information stored on the SIM card in the device. Alternatively, location data can be based upon proprietary handset branding data associated with the operating software load in the device stored in flash memory 144. This information is then used to look up an ARFCN associated with the RAI combination enabling the device to tune directly to the ARFCN reducing required search time. The RAI in the table may include LAC (location area code) and RAC (routing area code) information providing additional granularity if different ARFCN's are used throughout the system. Alternatively, a GPS (Global Positioning System) receiver integrated in the device may be used to determine a position of the device prior to initialization enabling a location look-up in the ARFCN table. By providing an ARFCN to the device prior to network access initial scans are much quicker thus decreasing the effective "time to find first channel" when powering on for the first time and enhancing the users first use experience. Further, even subsequent to a successful network access, the handset system selection may be improved with prior knowledge of ARFCNs in its current location. Examples are when a handset needs to rescan, for example, within RF coverage holes, or when a users manual wishes to rescan for frequencies.

The ARFCN table may be generated based upon information provided directly by carriers and stored on a server connected to the network or accessible during manufacturing or provided by a protocol where handsets already in field report in to a central server the ARFCNs that are being seen. The table may be retrieved from the server and provided to a mobile device at manufacture or during initial programming. In addition the server may be connected to one or more networks enabling updates to the ARFCN table to be received from carrier or from devices on the networks to update ARFCN table information. The updated ARFCN tables can then be provided to devices as required.

Figure 1:
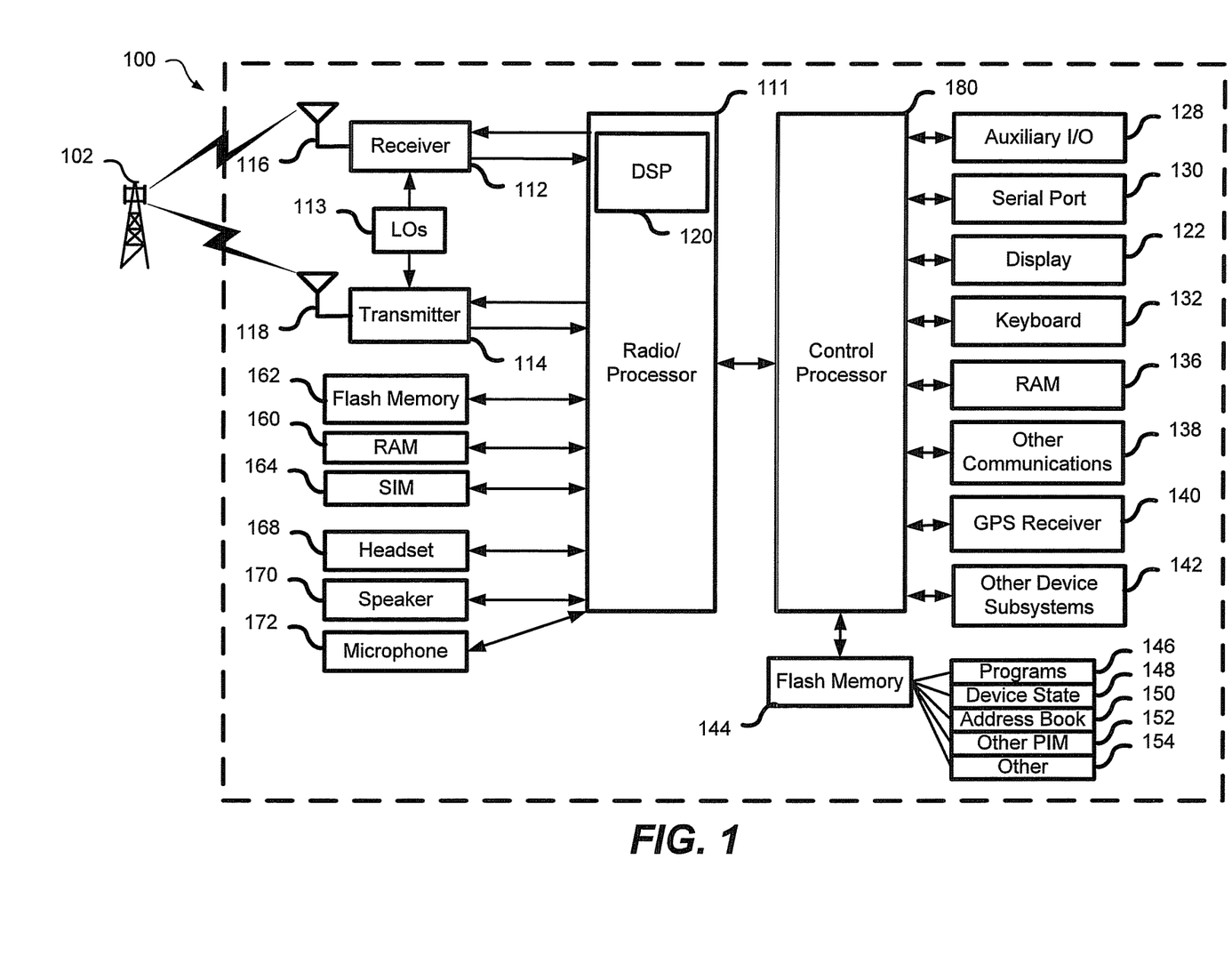
FIG. 1 shows a block diagram of a wireless mobile device.

FIG. 1 is a block diagram of a wireless mobile device 100 incorporating a communication subsystem having both a receiver 112 and a transmitter 114, as well as associated components such as one or more embedded or internal antenna elements 116 and 118, local oscillators (LOs) 113, and a processing module such as a digital signal processor (DSP) 120. The particular design of the communication subsystem will be dependent upon the communication network in which the device is intended to operate such as in a GSM, EDGE, UMTS, or 3GPP LTE networks.

The wireless mobile device 100 performs synchronization, registration or activation procedures by sending and receiving communication signals over the network 102. Signals received by antenna 116 through communication network 100 are input to receiver 112, which may perform such common receiver functions as signal amplification, frequency down conversion, filtering, channel selection and the like, and in the example system shown in FIG. 1, analog to digital (A/D) conversion. A/D conversion of a received signal allows more complex communication functions such as demodulation, decoding and synchronization to be performed in the DSP 120.

In a similar manner, signals to be transmitted are processed, including modulation and encoding for example, by DSP 120 and input to transmitter 114 for digital to analog conversion, frequency up conversion, filtering, amplification and transmission over the communication network 102 via antenna 118. DSP 120 not only processes communication signals, but also provides for receiver and transmitter control. For example, the gains applied to communication signals in receiver 112 and transmitter 114 may be adaptively controlled through automatic gain control algorithms implemented in DSP 120.

Wireless mobile device 100 preferably includes a radio processor 111 and a control processor 180 which together control the overall operation of the device. DSP 120 is located on radio processor 111. Communication functions are performed through radio processor 111.

Radio processor 111 interacts with receiver 112 and transmitter 114, and further with flash memory 162, random access memory (RAM) 160, the subscriber identity module 164, a headset 168, a speaker 170, and a microphone 172.

Control processor 180 interacts with further device subsystems such as the display 122, flash memory 144, random access memory (RAM) 136, auxiliary input/output (I/O) subsystems 128, serial port 130, keyboard 132, other communications 138, GPS receiver 140 and other device subsystems generally designated as 142.

Some of the subsystems shown in FIG. 1 perform communication-related functions, whereas other subsystems may provide "resident" or on-device functions. Notably, some subsystems, such as keyboard 132 and display 122, for example, may be used for both communication-related functions, such as entering a text message for transmission over a communication network, and device-resident functions such as a calculator or task list.

Software used by radio processor 111 and control processor 180 is preferably stored in a persistent store such as flash memory 144 and 162, which may instead be a read-only memory (ROM) or similar storage element (not shown). Those skilled in the art will appreciate that the operating system, specific device applications, or parts thereof, may be temporarily loaded into a volatile memory such as RAM 136 and RAM 160. Received communication signals may also be stored in RAM 136.

As shown, flash memory 144 can be segregated into different areas for computer programs 146, device state 148, address book 150, other personal information management (PIM) 152 and other functionality such as the ARFCN table generally designated as 154. These different storage types indicate that each program can allocate a portion of flash memory 144 for their own data storage requirements. Control processor 180, in addition to its operating system functions, preferably enables execution of software applications on the mobile station.

For voice communications, overall operation of wireless mobile device 100 is similar, except that received signals would preferably be output to the speaker 170 or headset 168 and signals for transmission would be generated by the microphone 172. Alternative voice or audio I/O subsystems, such as a voice message recording subsystem, may also be implemented on mobile station 102.

Serial port 130 in FIG. 1 would normally be implemented in a personal digital assistant (PDA)-type wireless mobile device for which synchronization with a user's desktop computer (not shown) may be desirable, but is an optional device component. Such a port 130 would enable a user to set preferences through an external device or software application and would extend the capabilities of wireless mobile device 100 by providing for information or software downloads to wireless mobile device 100 other than through a wireless communication network. The alternate download path may for example be used to load an encryption key onto the device through a direct and thus reliable and trusted connection to thereby enable secure device communication.

Other device subsystems 142, such as a short-range communications subsystem, is a further optional component which may provide for communication between wireless mobile device 100 and different systems or devices, which need not necessarily be similar devices. For example, the subsystem 142 may include an infrared device and associated circuits and components or a Bluetooth™ communication module to provide for communication with similarly enabled systems and devices.

Figure 2:
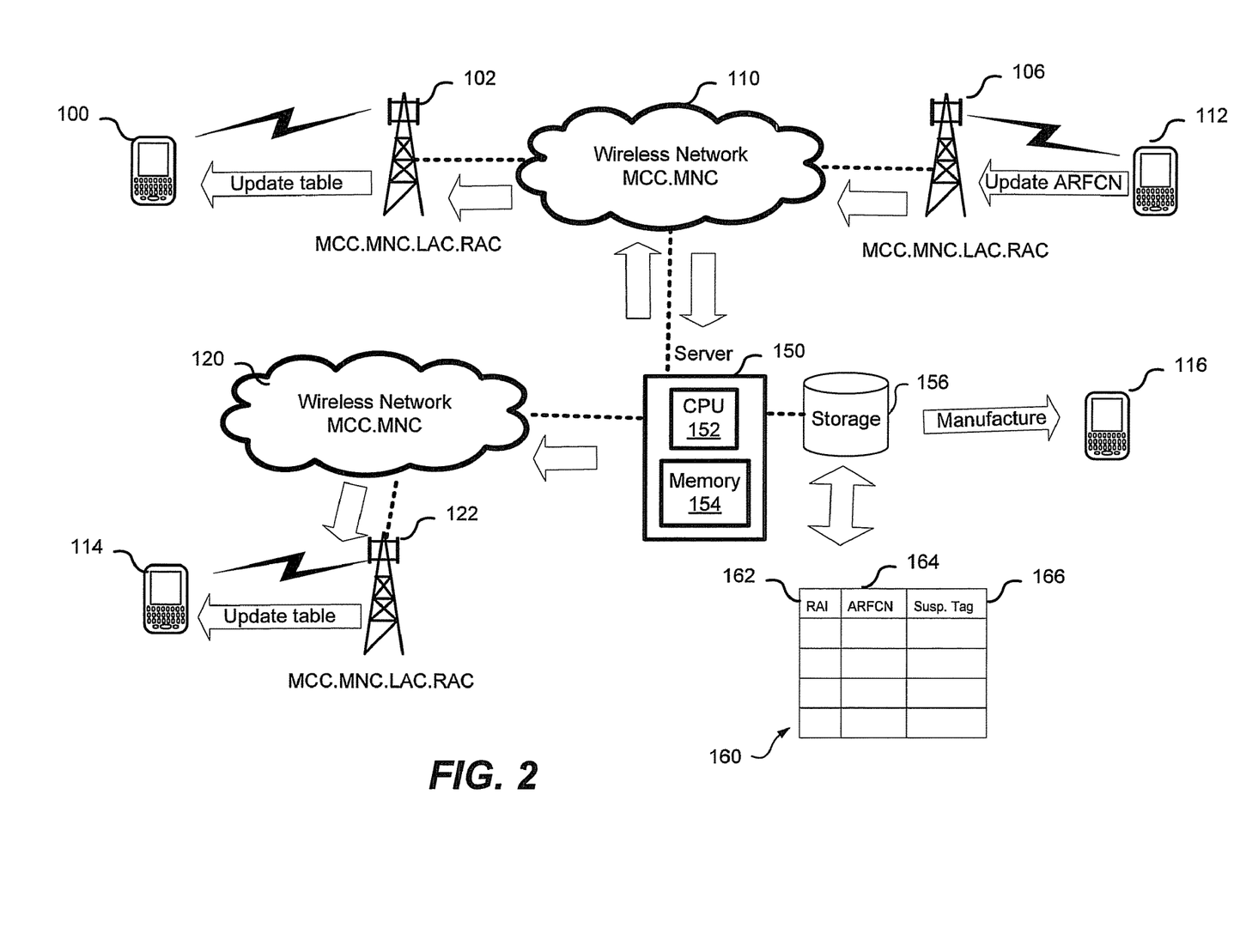
FIG. 2 shows a system diagram of server based system selection optimization.

FIG. 2 shows a system diagram of server based system selection optimization. Server 150 may be coupled to storage device 156. The storage device 156 stores ARFCN table 160 and computer executable code for generating the ARFCN table and sending and receiving updates. The ARFCN table comprises an entry for every RAI (routing area identifier) 162. Depending on the granularity required, the RAI may be solely based upon MCC.MNC or be further resolved by MCC.MNC.LAC.RAC, where LAC (location area code) and RAC (routing area code) are used if the mobile device has data associated with the last LAC.RAC used while accessing the network. One or more ARFCNs 164 can then be associated with each RAI entry. The ARFCN may be provided by a carrier or by mobile wireless device provided updates as discussed in connection with FIG. 5. If device updates to the ARFCN table are enabled, a suspension tag 166 can also be identified for each entry. The suspension tag 166 identifies a date at which the identified ARFCN is deemed be expired and will be removed form the table unless an update is received from a device on the network identifying the ARFCN as active. The wireless mobile device uses the tag as a trigger to only send an update only when necessary. The ARFCN table may also include GPS coordinates providing latitude and longitude, (not shown) associated with each RAI entry if a GPS receiver coupled to device is used during initialization or re-acquisition. The GPS coordinates in the ARFCN may be based on a range defining a service area for the RAI and ARFCN.

Each system 110 and 120 has a unique MCC.MNC. Base stations 102, 106 and 122 can then be assigned to a unique MCC.MNC.LAC.RAC if different AFRCN are utilized within the same MCC.MNC network. The wireless network 110 and 120 are in communication with server 150. The server 150 may be a central server or be resident on each carrier's network. The server 150 contains software stored in memory 154 and executed by one or more central processing units 152 for generating and sending (or pushing) ARFCN tables to devices in addition to receiving updates from wireless devices accessing the system. During manufacture or initial programming by the carrier a wireless mobile device 116 receives the ARFCN table or service book which would be stored within non-volatile memory 144 of the device.

In additional to directly editing the ARFCN table, updates may be provided from devices operating on the networks once initialized. For example, device 112 can provide an update to the server 150 identifying an ARFCN change associated either with the carrier's wireless network 110 MCC.MNC or even the BTS 106 MCC.MNC.LAC.RAC. The updates are provided once the device is operating on the network and has determined that the ARFCN used for network access does not match the ARFCN identified in the ARFCN table. Updates to the ARFCN table can then be pushed to devices on the network such as devices 100 and 114 at periodic intervals to unsure the most current information is available.

Figure 3:
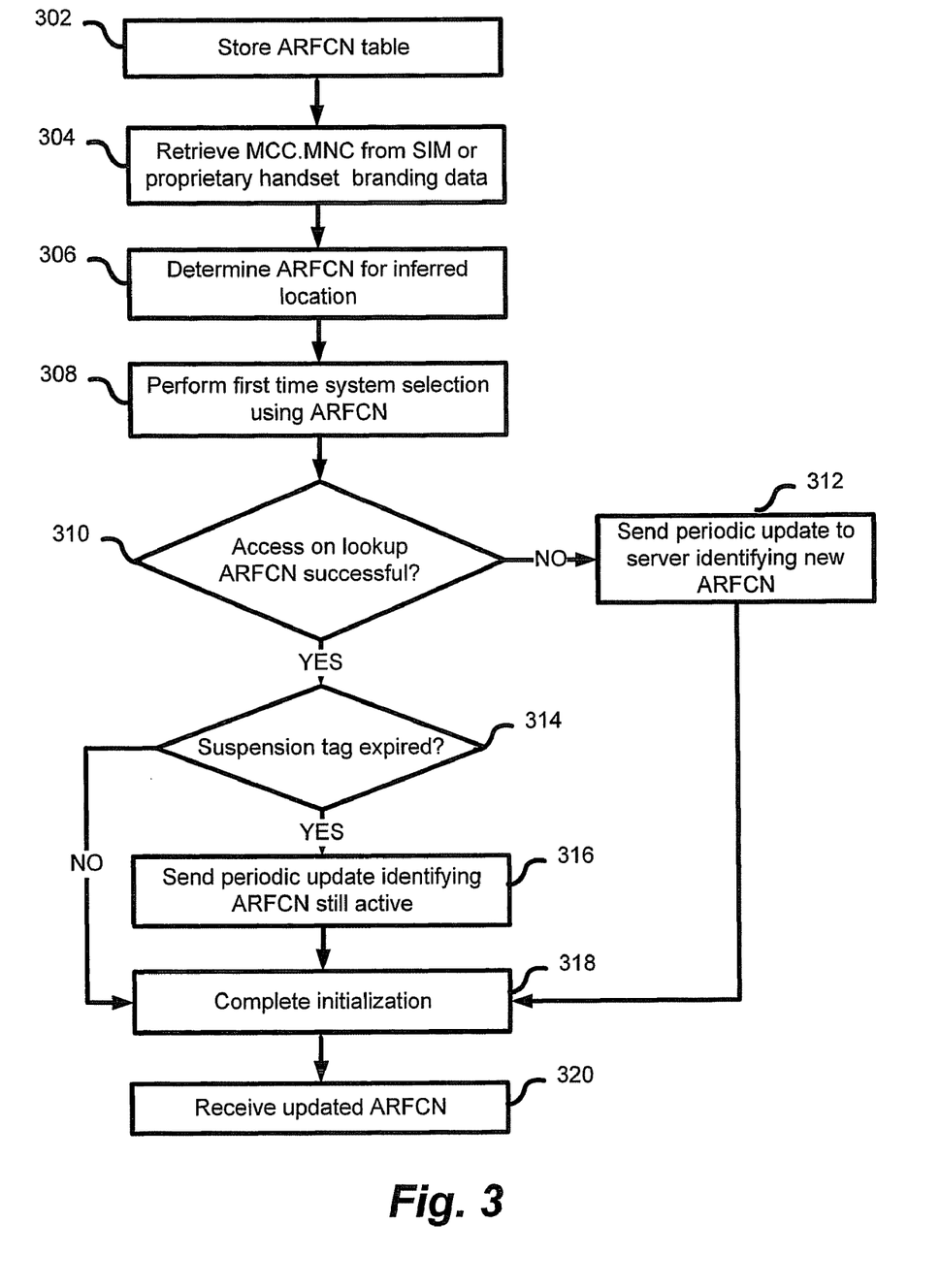
FIG. 3 shows a method of ARFCN selection in a wireless mobile device using internal location data.

FIG. 3 shows a method of ARFCN selection using a network identifier retrieved from the mobile wireless device 100. This method is distinct in that it bootstraps the handset with information on the assumption that most times, the initial use will be in the home MCC.MNC on particular ARFCNs. The wireless mobile device 100 receives an ARFCN table either during manufacture or initial programming or provisioning. The ARFCN is stored 302 in memory of the mobile wireless device. When the device powers up, prior to acquiring a network and registering on the network, the device retrieves location data to determine or infer 304 what is the primary carrier associated with the device either by retrieving MCC.MNC information from the SIM or by accessing proprietary handset branding The handset may use and empty MRU (most recently used AFRCN) as a trigger to determine its likely location via carrier branding and thereby make use of the ARFCN table. information which identifies an associated MCC.MNC. A look-up 306 in the ARFCN table is performed to determine the associated ARFCN for the MCC.MNC. System selection is then performed 308 using the selected ARFCN frequency or a series of applicable ARFCNs. If the ARFCN used is not successful at accessing the system, NO at 310, a periodic update can then be sent 312 over the wireless network to server 150 providing details regarding the MCC.MNC and the ARFCN used to access the system. If the system is accessed using the ARFCN, YES at 310, it can then be determined if the suspension tag associated with the ARFCN has expired 314. The suspension tag expiry is defined in relation to a date or time interval associated with the RAI entry in the ARFCN table 160 assigned by the server upon creation of the table. If the tag has expired, YES at 314, a periodic update can be sent to server 150 identifying that the ARFCN is still active 316. The suspension tag can then be increased at the next ARFCN update. If the suspension tag has not expired, NO at 314, initialization or re-acquisition is completed at 318. At 320 the device may then receive an updated ARFCN table for use during future re-initializations.

Figure 4:
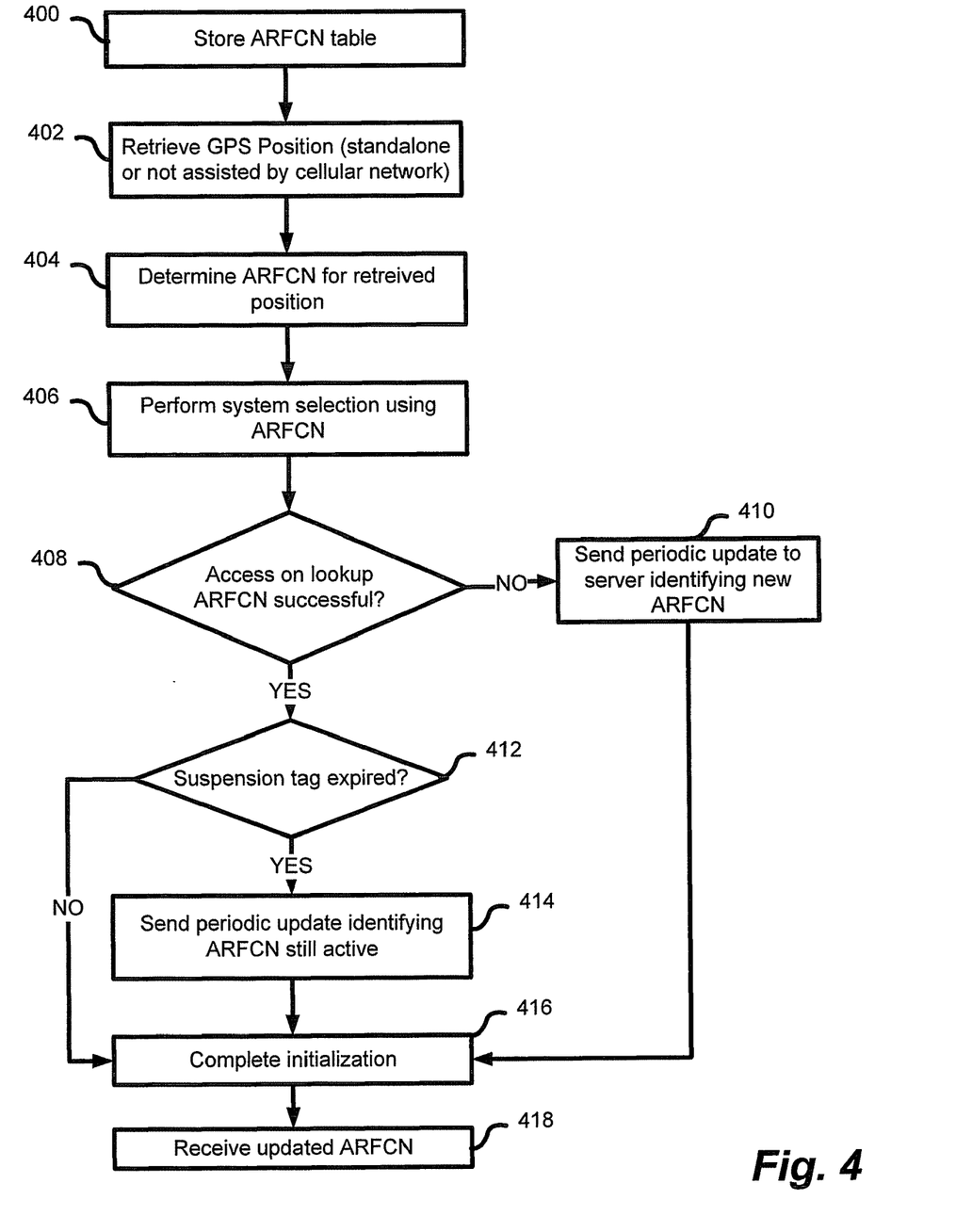
FIG. 4 shows a method of ARFCN selection in a wireless mobile device using a GPS location data.

FIG. 4 shows a method of system selection using location data such as GPS position data. The wireless mobile device 100 receives an ARFCN table, either during manufacture or initial programming or provisioning. The ARFCN is then stored 400 in memory of the mobile wireless device. The mobile wireless device retrieves GPS location information 402 from an internal GPS receiver or from an external GPS source coupled to the device prior to system access during power up or re-initialization. As the device is not on the network, network assisted GPS is not utilized. A look-up 404 in the ARFCN table is performed to determine the associated ARFCN for the associated location. System selection is then performed 406 using the selected ARFCN frequency. If the ARFCN used is not successful at accessing the system, NO at 408, a periodic update can then be sent 410 to server 150 providing details regarding the GPS location and the ARFCN used to access the system after successful system acquisition. If the system is accessed using the ARFCN, YES at 408, it can then be determined if the suspension tag associated with the ARFCN has expired 412. If the tag has expired, YES at 412, a periodic update can be sent to server 150 identifying that the ARFCN is still active 414. The suspension tag can then be increased at the next ARFCN update. If the suspension tag has not expired, NO at 412, initialization or re-acquisition is completed at 416. At 418 the device may then receive an updated ARFCN table for use during future re-initializations.

Figure 5:
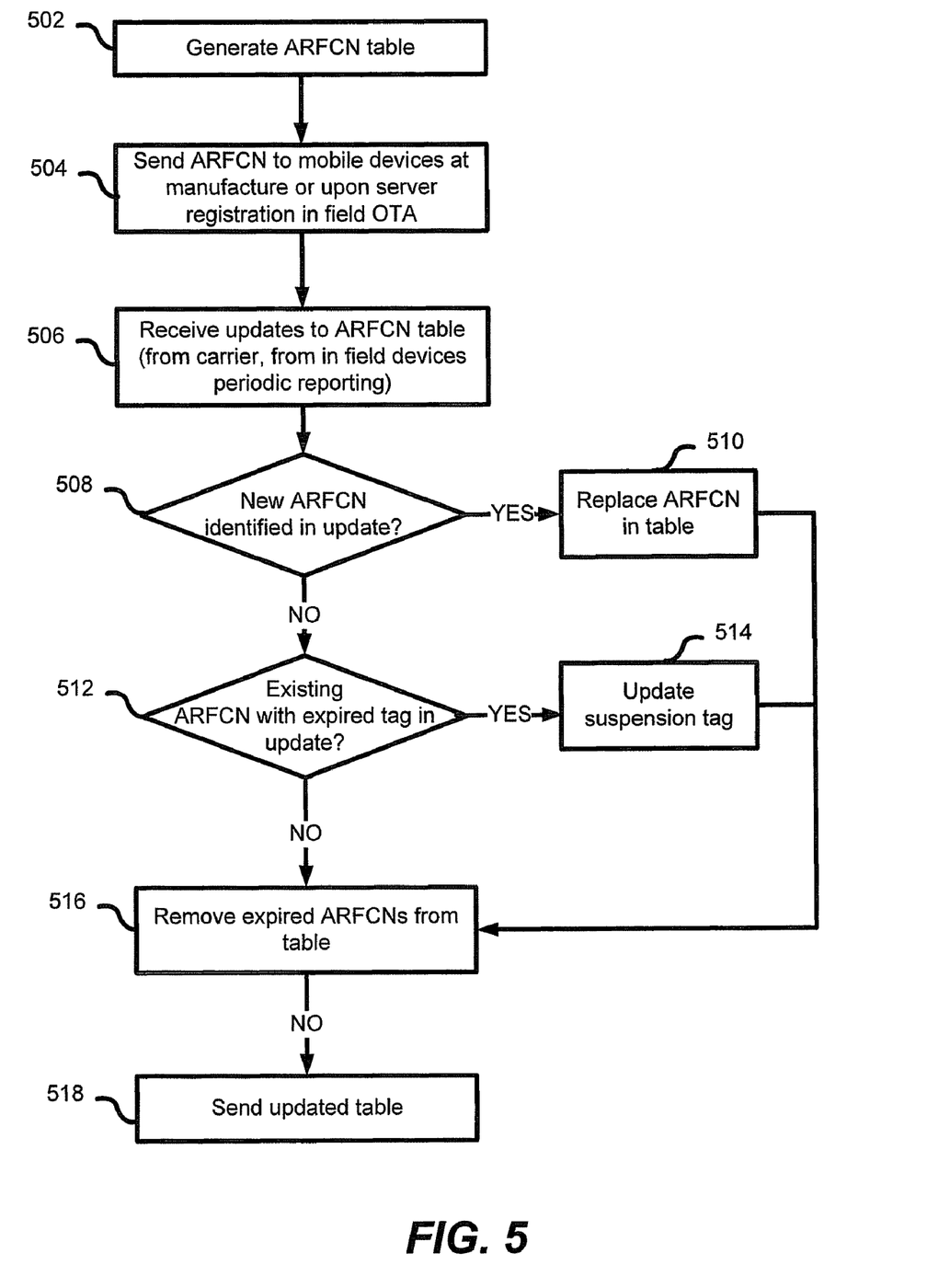
FIG. 5 shows a method of generating and maintaining ARFCN tables at a server.

FIG. 5 shows a method of maintaining ARFCN tables at a server. The server may be used to provide ARFCN a stand alone server or integrated as software with other servers during the manufacturing processes or coupled to the carrier wireless network to provide updates. An initial ARFCN table is generated 502 for loading to the wireless mobile devices. The ARFCN table may be populated by either information provided by carriers or populated based upon data acquired from devices on the associated networks via update messages. The ARFCN table is then sent to mobiles devices either during manufacture or initial programming 504. Alternatively the table may be provided upon registration of the wireless mobile device with the server over the air and pushed to the device. If the mobile wireless device 100 software is configured to send updates, the server receives updates from information obtained by devices accessing systems or directly provided by carriers 506. If a new ARFCN is identified in the update, YES at 508, the ARFCN for the associated RAI is replaced 510. If the ARFCN is not new, NO at 508, it is then determined if the update is associated with an existing ARFCN that has an expired suspension tag. If the suspension tag is expired in the update, YES at 512, the suspension tag is updated to a new value 514. If the tag in the updated is not expired, NO at 512, expired ARFCNs can then be removed from the table periodically 516 based upon a pre-defined time interval after the suspension tag expiry. The updated table can then be sent to devices 518 or provided for upload to new devices during manufacturing or provisioning.

While a particular embodiment of the present method for providing wireless system selection optimization has been described herein, it will be appreciated by those skilled in the art that changes and modifications may be made thereto without departing from the disclosure in its broadest aspects and as set forth in the following claims.

The invention claimed is:

1. A method of system selection in a mobile wireless device, the mobile wireless device operable on a 3GPP wireless network, the method comprising:
storing an absolute radio frequency channel number (ARFCN) table in a memory of the wireless mobile device;
retrieving location data associated with the wireless device prior to accessing the wireless network;
determining an ARFCN associated with the retrieved location data from the ARFCN table stored in memory, the determined ARFCN comprising a suspension tag specifying an expiry period of the determined ARFCN;
performing a system selection using the determined ARFCN;
determining that the system selection using the determined ARFCN is successful and that the suspension tag is expired; and
sending an indication to a remote server maintaining a remote ARFCN table that the ARFCN is in use,
wherein the ARFCN table comprises a routing area identifier (RAI); and
wherein the RAI associates with the determined ARFCN.

2. The method of claim 1 wherein the ARFCN table is stored in the memory of the wireless device at the time of manufacture.

3. The method of claim 2 wherein the RAI comprises a mobile country code (MCC) and mobile network code (MNC).

4. The method of claim 3 wherein the RAI further comprises a location area code (LAC) and routing area code (RAC).

5. The method of claim 4 wherein the retrieved location data is a GPS location retrieved from a GPS receiver coupled to the wireless mobile device, and the location data of the ARFCN table comprises GPS location data associated with the RAI.

6. The method of claim 3 wherein the retrieved location data is inferred based on a MCC.MNC retrieved from a subscriber identity module (SIM).

7. The method of claim 3 wherein the retrieved location data is inferred based upon branding information associated with the operating software load of wireless mobile device to determine a corresponding MCC.MNC.

8. The method of claim 3 further comprising sending an update to a server coupled to the wireless network, the update identifying an ARFCN not present in the ARFCN table on which the wireless mobile device successfully initialized and location data of the device.

9. The method of claim 2 further comprising receiving an updated ARFCN table over-the-air.

10. A wireless mobile device in a 3GPP wireless network, the wireless mobile device comprising:
a memory comprising an absolute radio frequency channel number (ARFCN) table; and
a control processor for executing instructions in the memory comprising:
retrieving location data associated with the wireless device;
determining from the ARFCN table an ARFCN associated with the location data, the determined ARFCN comprising a suspension tag specifying an expiry period of the determined ARFCN;
performing a system selection using the determined ARFCN;
determining that the system selection using the determined ARFCN is successful and that the suspension tag is expired; and
sending an indication to a remote server maintaining a remote ARFCN table that the ARFCN is in use,
wherein the ARFCN table comprises a routing area identifier (RAI); and
wherein the RAI associates with the determined ARFCN.

11. A method on a server of enabling system selection by a plurality of wireless mobile devices in a 3GPP wireless network, the method comprising:
generating an absolute radio frequency channel number (ARFCN) table comprising location data and one or more associated ARFCNs;
sending the ARFCN table to each of the plurality of wireless mobile devices, wherein each of the plurality of wireless mobile devices utilizes a selected ARFCN associated with determined location data when attempting to initialize on the wireless network;
receiving an indication from a wireless mobile device that an ARFCN in the ARFCN table is in use, when the wireless mobile device successfully initializes on the wireless network using the ARFCN and with a suspension tag in the ARFCN is expired; and
updating the suspension tag of an entry associated with the ARFCN based on the received indication,
wherein the suspension tag identifies an expiry period for the ARFCN associated with an RAI.

12. The method of claim 11 wherein the location data is associated with routing area identifiers (RAIs) comprising a mobile country code (MCC) and mobile network code (MNC).

13. The method of claim 11 further comprising:
receiving updates from the plurality of wireless mobile devices through the wireless network, the updates providing information for updating new or existing ARFCNs associated with a particular RAI in the ARFCN table;
updating entries in the ARFCN table based upon the updates received from the plurality of wireless mobile devices; and
sending the updated ARFCN to the plurality of wireless mobile devices.

14. The method of claim 13 further comprising periodically removing ARFCN entries which have expired.

15. The method of claim 11 wherein the ARFCN table contains GPS location data associated with the RAI and the RAI further comprises a location area code (LAC) and routing area code (RAC).

16. The method of claim 11 wherein the ARFCN table is sent to each of the plurality of wireless mobile devices during handset manufacture.

17. A server for enabling system selection by a plurality of wireless mobile devices in a 3GPP wireless network, the server comprising:
a memory; and
a processor for executing instructions in the memory comprising:

generating an absolute radio frequency channel number (ARFCN) table comprising location data and one or more associated ARFCNs;

sending the ARFCN table to each of the plurality of wireless mobile devices wherein each of the plurality of wireless mobile devices utilizes a selected ARFCN associated with determined location data when attempting to initialize on the wireless network;

receiving an indication from a wireless mobile device that an ARFCN comprising a suspension tag in the ARFCN table is in use, when the wireless mobile device successfully initializes on the wireless network using the ARFCN and the suspension tag is expired; and updating the suspension tag associated with the ARFCN based on the received indication, wherein the suspension tag identifies an expiry period for the ARFCN associated with an RAI.

18. The server of claim 17, wherein the instructions further comprise:

receiving updates from the plurality of wireless mobile devices through the wireless network, the updates providing information for updating new or existing ARFCNs associated with a particular RAI in the ARFCN table;

updating entries in the ARFCN table based upon the updates received from the plurality of wireless mobile devices; and sending the updated ARFCN to the plurality of wireless mobile devices.

* * * * *